July 28, 1953  M. DEN HERTOG  2,647,164
VOICE-FREQUENCY CODE SIGNALING SYSTEM
Filed April 22, 1948  6 Sheets-Sheet 1

FIG.1.

Inventor
MARTINUS DEN HERTOG,
By
Robert Harding Jr.
Attorney

July 28, 1953     M. DEN HERTOG     2,647,164

VOICE-FREQUENCY CODE SIGNALING SYSTEM

Filed April 22, 1948     6 Sheets-Sheet 3

FIG. 2

Inventor
MARTINUS DEN HERTOG
By
Attorney

July 28, 1953  M. DEN HERTOG  2,647,164
VOICE-FREQUENCY CODE SIGNALING SYSTEM
Filed April 22, 1948  6 Sheets-Sheet 4

Inventor
MARTINUS DEN HERTOG
By Robert T Harding Jr
Attorney

FIG. 3A.

Inventor
MARTINUS DEN HERTOG

July 28, 1953 M. DEN HERTOG 2,647,164
VOICE-FREQUENCY CODE SIGNALING SYSTEM
Filed April 22, 1948

FIG.4.

TABLE A — CODE FOR DIGIT TRANSMISSION
TABLE B — SEQUENCE OF COUPLING OPERATIONS WHILE TRANSMITTING DIGIT "8"

——— = IMPULSE AT 900 CPS
----- = IMPULSE AT 600 CPS

Inventor
MARTINUS DEN HERTOG
By
Attorney

Patented July 28, 1953

2,647,164

UNITED STATES PATENT OFFICE 2,647,164

VOICE-FREQUENCY CODE SIGNALING SYSTEM

Martinus den Hertog, Antwerp, Belgium, assignor to International Standard Electric Corporation, New York, N. Y., a corporation of Delaware Application April 22, 1948, Serial No. 22,617
In the Netherlands April 24, 1947

4 Claims. (Cl. 179—16)

The invention relates to an automatic or semi-automatic telephone system or similar system for establishing connections and more particularly to circuit arrangements for traffic between a plurality of exchanges, in which the called subscriber's number is transmitted by means of voice frequency signals in code form from the register at the originating exchange to the register at the terminating exchange whether or not through intermediate tandem exchanges.

The object of the invention is amongst others to increase the safety of the switching operations and to facilitate the detection of faults during the transmission and reception of voice frequency code signals in impulse form.

In a prior U. S. patent application Serial No. 731,136, filed February 26, 1947, by M. den Hertog and J. Kruithof, the general principle of transmitting subscribers' numbers from a register at an originating exchange to a register at a terminating exchange via interexchange junctions, by means of voice frequency code signals, has already been described.

The above mentioned patent application furthermore describes how during the transmission of the first digit, a low resistance loop bridged across the conductors of the interexchange junction through a relay Lur at the register of the terminating exchange is opened, so that a relay Abr at the register of the originating exchange is released and thereby prevents further digits from being transmitted until such time as, upon the reclosure of the low resistance loop, relay Abr is operated again. The particular reason for which this was done was this in that manner an opportunity was given to the register at the terminating exchange to control the first selection thereat and to further determine whether thereafter the transmission of further digits to said register could be permitted (as in the case of connections which have to be completed at the same exchange) or whether a distant register had to be connected up and the first register might disconnect itself (as in the case where the connection has to be extended to another distant exchange).

An objection to the system of the above mentioned patent application however, was that the opening of the low resistance loop at the register of the terminating exchange might take place at an arbitrary moment during the transmission of the impulses and if this happened during the transmission of a voice frequency signal, it resulted in undesired distortion thereof caused by current surges and condenser discharges. The signal received might be quite different from that transmitted.

These well known circuit arrangements furthermore possessed the drawback that, if for some reason or other a voice frequency impulse of, for example the second digit was lost, the first impulse of the third digit would be added to the remaining three impulses of the second digit, which in most cases resulted in the registering of a wrong second digit. Furthermore the three last impulses of the third digit would now be received as the first three impulses of this digit, and would be completed by an impulse which would be subtracted from the next or fourth digit. The result of this would be that all digits, reckoned from the second digit, would be received incorrectly; the last digit would consist of only three impulses and it would be impossible to complete a connection. With this circuit arrangement it is practically impossible to check at which point an impulse has been lost, because the loss might take place at any of the digits concerned.

The object of the present invention is amongst others to provide means obviating these drawbacks, and to make it possible to determine whether each digit has been transmitted completely.

In the system to be described hereinafter the code signals for each digit consist of a constant number of impulses, and the transmission of these code signals takes place in response to a change of the D. C. condition of the junction or junctions under the control of the register at the terminating exchange.

In accordance with the present invention the change in the D. C. condition can take place only when no voice frequency signal is being transmitted, because such change can be applied only after a complete voice frequency impulse has been received. Furthermore in a condition in which a change of the D. C. condition may be expected, a subsequent voice frequency impulse can be transmitted only after the change of the D. C. condition has been completed.

In accordance with another feature of the invention the transmission of the voice frequency code signal for each digit can start only when a predetermined change of the D. C. condition (such as the closure of the circuit via the *a* conductor of the junction) has taken place. Moreover, any further change of the D. C. condition (such as the re-opening of the circuit via the *a* conductor) also takes place during a silent interval between two successive impulses of a code signal.

The further change in question, according to another feature of the invention, takes place in response to the end of the first of the two impulses under consideration, and the second of these impulses is sent in response to the said further change of the D. C. condition (that is, the opening of the circuit via the $a$ conductor).

Similarly the transmission of the code signal for a subsequent digit can start only in response to a change of the D. C. condition (e. g. the closure of the circuit via the $a$ conductor, which latter occurs only) if all impulses of the previous code signal have been received completely.

The invention will be described with reference to the drawings in which.

Figure 1:
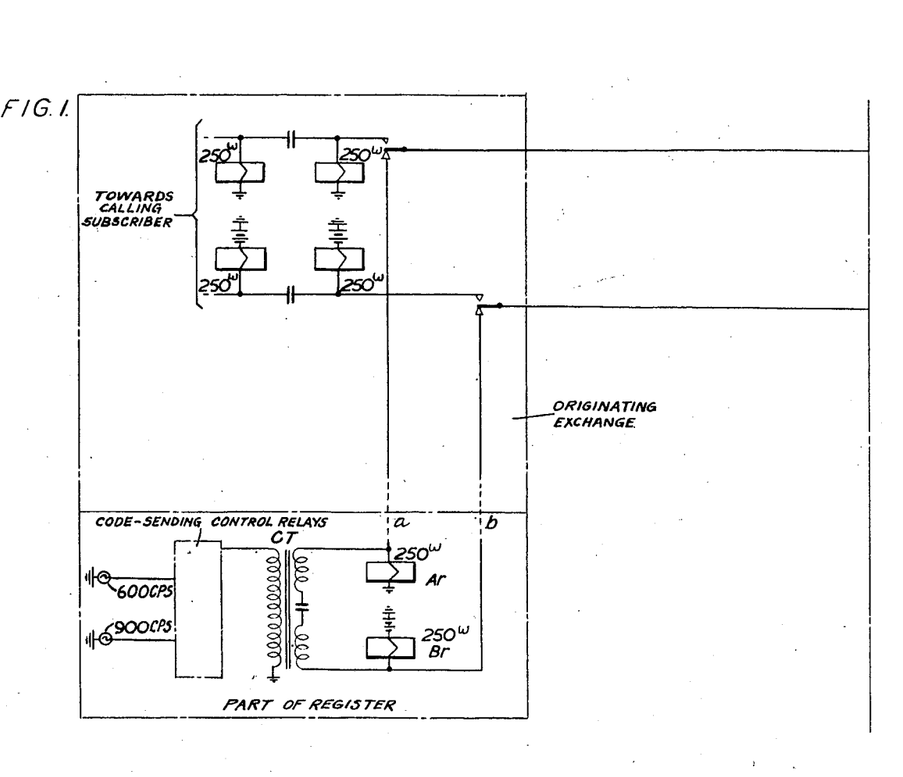
Figs. 1 and 1A, when juxtaposed side by side, show schematically a system in accordance with the invention.
Figure 1A:
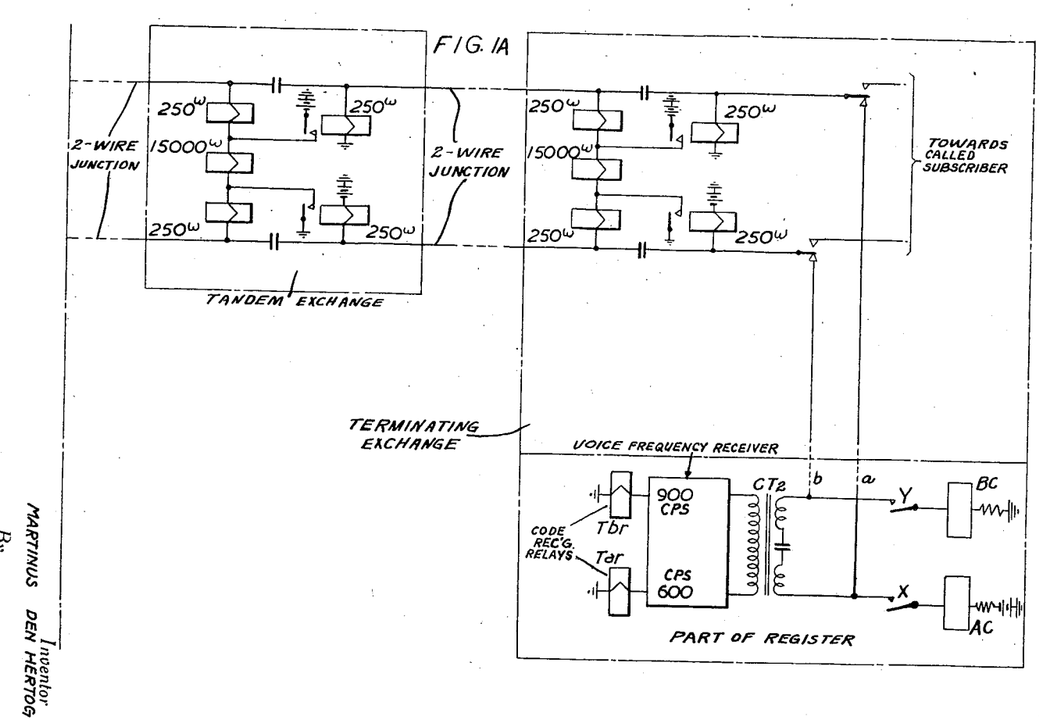

Fig. 1 illustrates parts of an originating exchange and in Fig. 1A parts of a tandem exchange and a terminating exchange are shown. The two drawings together illustrate the situation when a register at the originating exchange has become connected by means of automatic switching equipment (which may be of any well known type and has therefore been omitted for greater clarity), via a two-wire junction to the tandem exchange and thence via another two-wire junction to a register in the terminating exchange, and when the circuits have been conditioned, by means which form no part of the invention, for the exchange of signals between said registers.

Figure 2:
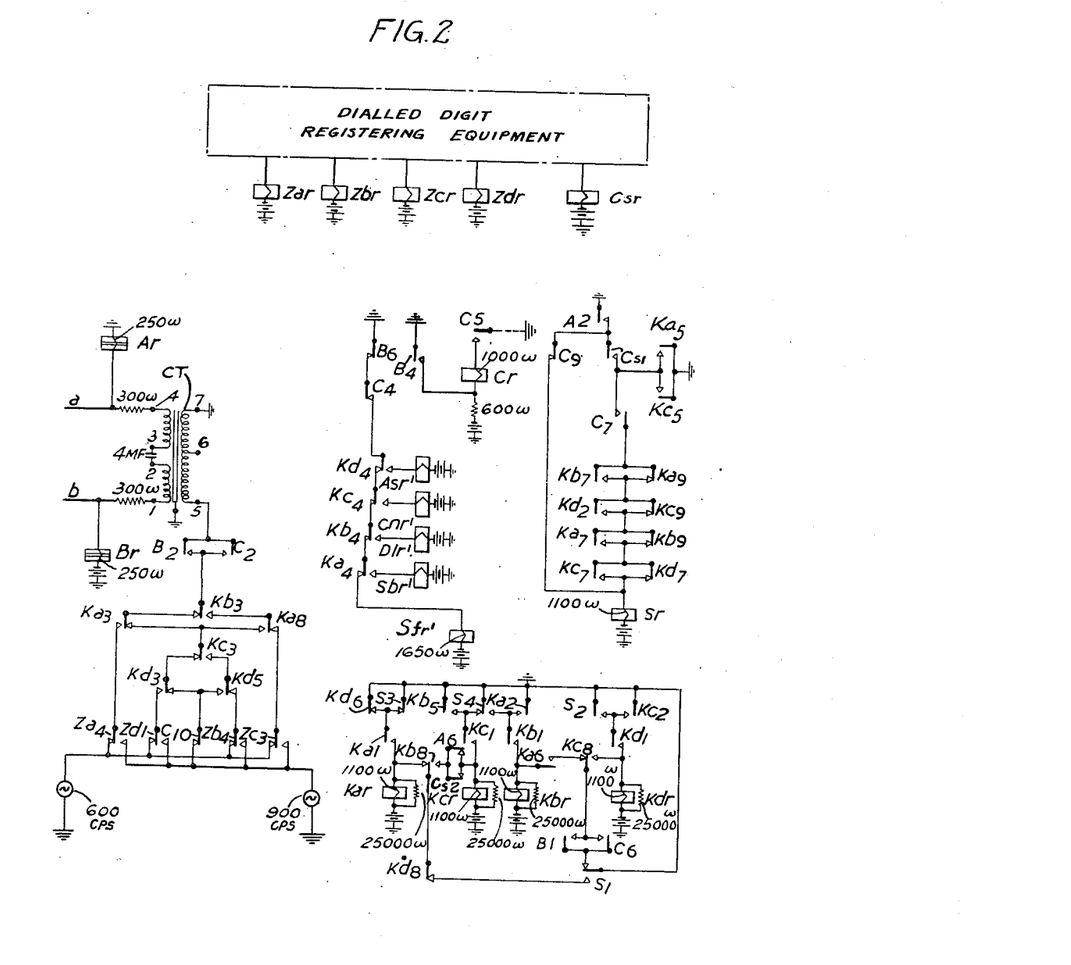
Fig. 2 represents the essential parts of a register at an originating exchange.

For the register at the originating exchange, further detailed in Fig. 2, the relays $Ar$ and $Br$ have been shown also in Fig. 1, as well as sources of 690 and 900 C. P. S. alternating current. The relays for controlling the transmission of voice frequency code signals are to be understood as included inside the dotted rectangle.

For the register at the terminating exchange, further detailed in Fig. 3, the relays $Tar$ and $Tbr$ have been shown also in Fig. 1, as well as the voice frequency signal receiver which controls them, two switching contacts X and Y, the significance of which latter will be explained hereafter.

Figure 4:
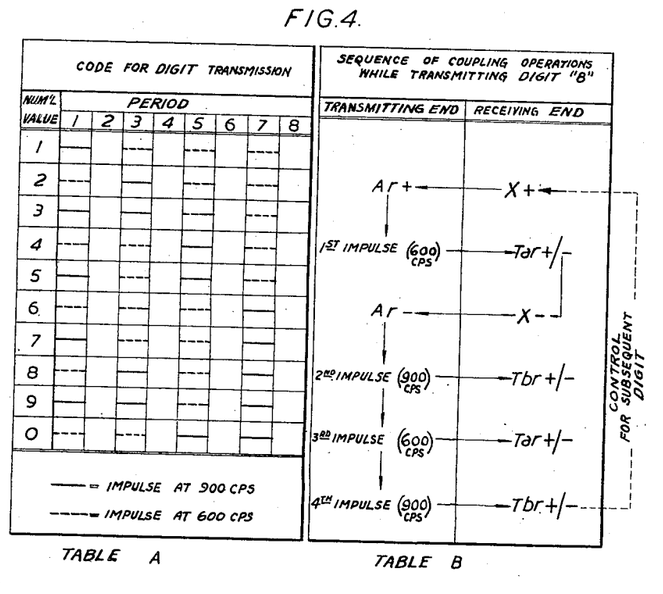
Fig. 4 illustrates in table A the signalling code used for the transmission of different digital values, and in a table B the different switching operations in sequential order which occur during the transmission of a particular code signal.

The sequence in which the said relays $Ar$, $Tar$, $Tbr$, respond and the switching contact X is operated, is schematically illustrated in table B of Fig. 4, for the case when the digit "8" is transmitted. The sign "+" indicates that a contact closes or a relay operates, whereas the sign "—" indicates that a contact opens or a relay releases.

With reference to Fig. 2, the equipment provided in an originating register for signalling to and from distant exchanges comprises a transformer CT, which is connected via the automatic switching equipment to the interchange junction, as indicated in Fig. 1, and which serves to transmit VF-impulses to this junction, two relays $Ar$ and $Br$, connected to the $a$ and $b$ wires respectively, and thence to the junction and which serve to receive D. C.-signals from the distant exchange, a stepping relay $Sr$, 4 counting relays $Kar$, $Kbr$, $Kcr$ and $Kdr$, and a helping relay $Cr$. In addition, 4 digit storage relays, $Zar$, $Zbr$, $Zcr$ and $Zdr$, a digit transfer control relay $Csr$ and five line condition registering relays, $Sfr'$, $Sbr'$, $Dlr'$, $Cnr'$, and $Asr'$ are shown, the functions of which will be described.

The purpose of the equipment shown in Fig. 2 is twofold. When a connection has been established over an interexchange junction between a register at an originating exchange and a distant register, the equipment is used first to transfer to said distant register, by means of voice frequency code signals, the values of one or more dialled digits of a called subscriber's line number which have previously been registered and stored in the originating register.

It is well known that any one of ten numerical values can be recorded by operating one or more of four relays in accordance with one of several possible permutation codes. In a preferred arrangement, four relays are assigned the numerical values 1, 2, 4 and 6, respectively, and may be operated in combinations such that the sum of the individual values of the operated relays at all times indicates the value of a digit stored by the group. With reference again to Fig. 2, one or more of the four relays $Zar$, $Zbr$, $Zcr$, and $Zdr$ are to be understood to have been operated by the usual dial-controlled digit registering equipment, in any convenient manner, to record the value of a digit of a subscriber's line number which is to be transferred to the distant register, in accordance with the following "1-2-4-6 code" table, in which "+" indicates "operated":

| Numerical value | Condition of relay | | | |
| --- | --- | --- | --- | --- |
| | $Zar$ (1) | $Zbr$ (2) | $Zcr$ (4) | $Zdr$ (6) |
| 1 | + | | | |
| 2 | | + | | |
| 3 | + | + | | |
| 4 | | | + | |
| 5 | + | | + | |
| 6 | | | | + |
| 7 | + | | | + |
| 8 | | + | | + |
| 9 | + | + | | + |
| 10 | | | + | + |

It is also to be understood that the relay $Csr$ has become operated at the same time as the storage relays, as an indication that transfer of the said digital value may take place. The equipment of Fig. 2 may be used to transfer any desired number of digital values recorded in succession upon the relays $Zar$—$Zdr$, under the control of relay $Csr$.

The digit storage relays $Zar$—$Zdr$ correspond in function and purpose to the relays $Kir$—$Kdr$ shown in Fig. 5 of the aforementioned copending U. S. application, Serial No. 731,136, which discloses a preferred method for operating the said relays digit-by-digit in combinations in accordance with the "1-2-4-6" permutation code.

The second purpose of the equipment of Fig. 2 is to cooperate with the distant register, when the latter has selected the wanted subscriber's line in accordance with the line number transferred to it, and has tested it, in signalling the condition of the said line from the said distant register to the originating register. For this purpose, the equipment of Fig. 2, upon receipt of a D. C. signal from the distant register, is used to transmit a train of voice frequency impulses thereto, said train being interrupted by another D. C. signal from the distant register, which signal may occur during the first, second, third, fourth and fifth impulse to signal one of five possible line conditions, the particular condition signalled being recorded by the operation of one of the five relays $Sfr'$, $Sbr'$, $Dlr'$, $Car'$ and $Asr'$.

The transformer CT and relays $Ar$, $Br$, $Sr$, $Kar$, $Kbr$, $Kcr$ and $Kdr$ are used both for number transfer and for signalling the condition of the called subscriber's line. It will, therefore, be necessary to give a description of both these operations, in order to explain the different functions of these relays; these now follow.

Transmission of code signals to the terminating register

It is to be understood that, during the establishment of a connection between the originating register including the equipment of Fig. 2 and the distant terminating register (which connection has been illustrated in Figs. 1 and 1A), the relay $Cr$, Fig. 2, has been operated in any convenient manner and is now locked over its make contact C5 to a controlled ground; that relay $Ar$, having become connected, either directly via the $a$ wire of the junction or indirectly via a plurality of junctions and via repeating relays as indicated in Figs. 1 and 1A, to the terminating register, operates in virtue of the battery connected to said wire (see Fig. 3) as an indication that said register is ready to accept a digital value; and that relay $Br$, having similarly become connected via the $b$ wire of said junction or junctions to the terminating register, is at this moment unoperated because the $b$ wire circuit in said register is open.

One or more of the four digit storage relays having been operated in a combination representing the numerical value of the particular digit to be transferred, and relay $Csr$ being also operated, a train of operations controlled by make contacts A2 and Cs2 jointly is initiated, in which the pulsing relay $Sr$ will energise and release four times consecutively and the counting relays $Kar$—$Kdr$ will all operate and then all release consecutively.

This train of operation may be considered as divided into eight periods, each comprising the duration of either an operation or a release of the stepping relay $Sr$, and either an operation or a release of one of the counting relays $Kar$—$Kdr$. These eight periods are used to constitute the eight time-intervals required for sending four impulses with tone frequency over the junction; an impulse is sent during each of the four odd periods and there is silence during the four even periods, in accordance with table A of Fig. 4. The manner in which these relays operate in the eight consecutive periods, is illustrated by the following table in which the sign "+" means that the corresponding relay has been operated, and the sign "−" means that the corresponding relay has been released:

| Period | Condition of Counting relays | | | | Period is used for— |
|---|---|---|---|---|---|
| | $Kar$ | $Kbr$ | $Kcr$ | $Kdr$ | |
| 1 | + | | | | VF-impulse. |
| 2 | + | + | | | Silence. |
| 3 | + | + | + | | VF-impulse. |
| 4 | + | + | + | + | Silence. |
| 5 | − | + | + | + | VF-impulse. |
| 6 | − | − | + | + | Silence. |
| 7 | − | − | − | + | VF-impulse. |
| 8 | − | − | − | − | Silence. |

The operation is as follows:

The operation of $Ar$ closes at contact A2 the circuit for the operation of $Sr$, as follows: Ground, make contacts A2, Cs1 and C7, break contacts $Ka_9$, $Kc_9$, $Kb_9$ and $Kd_7$, winding of $Sr$ to battery.

FIRST PERIOD

When relay $Sr$ operates it closes a circuit for the operation of $Kar$ as follows: From ground via make contact S1, break contacts $Kd_8$ and $Kb_8$, winding of $Kar$ to battery.

$Kar$ operates and locks itself via its make contact $Ka_1$ to ground via break contact $Kd_6$. The operation of $Kar$ marks the beginning of the first period. At its contact $Ka_9$ it opens the circuit for $Sr$, which releases.

SECOND PERIOD

The release of $Sr$ closes a circuit for the operation of $Kbr$ as follows: Ground, break contact S1, make contact C6, break $Kc_8$, make $Ka_6$, winding of $Kbr$ to battery.

The operation of $Kbr$ marks the beginning of the second period. $Kbr$ locks via its contact $Kb_1$ and make contact $Ka_2$ to ground. Further, at its contact $Kb_7$ it overbridges the break produced by $Ka_9$ in the circuit for $Sr$, which therefore, re-energises.

THIRD PERIOD

When $Sr$ operates it prepares a circuit for $Kcr$ as follows: Ground, make contact S1, break $Kd_8$, make $Kb_8$, break $A_6$, winding of $Kcr$ to battery.

This circuit extends via a break contact $A_6$ of relay $Ar$, so that this third period can start only after relay $Ar$ has been de-energised. In the normal case, $Ar$ does in fact release during the second period, because in the register at the terminating exchange, battery is disconnected from the $a$ conductor in the interval following the reception of the second voice frequency impulse, as will be explained in detail hereafter. The reason for this arrangement is the following:

In accordance with a feature of the invention the first impulse of each digit can be sent out only if the register at the terminating exchange has determined that the four impulses of the previous digit have been transmitted completely. This check is made with the aid of relay $Ar$, which is operated by a battery via the $a$ conductor from the register at the terminating exchange only if the previous digit has been received completely and which relay is then de-energised by removing this battery, during the reception of each digit. In accordance with the invention this de-energisation of $Ar$ takes place at a moment when no voice frequency signal is being sent. In order to attain this, the battery on the $a$ conductor is removed after the reception of the first voice frequency impulse and the second voice frequency impulse is permitted to start only after the opening of battery at the register of the terminating exchange has completed its switching action at the register of the originating exchange, that is, has caused the release of $Ar$.

The reason why opening of the circuit for relay $Ar$ takes place during a silent interval is the following:

It has been found that if a change is effected in the direct current flowing through the $a$ and $b$ conductors of the junction, during the time a voice frequency current is transmitted along this junction, this change of the D. C. condition, that is, the opening or closing of the D. C. circuit may have a detrimental influence upon the operation of the voice frequency receiving equipment. This is a consequence of current surges and condenser discharges, and is aggravated if the signalling is effected via the repeating bridge circuits of one or more tandem exchanges.

As will be clear from the foregoing description, every change of the D. C. condition of the line takes place at a moment when no voice frequency signal is being transmitted. This also holds for the moment at which relay $Ar$ is operated, that is, after the complete reception of a digit.

The operation of $Kcr$ marks the beginning of the third period. As stated this cannot happen until relay $Ar$ has released and closed its break contact $A_6$. The ground at make contact $A_2$ which causes the first operation of $Sr$, is opened by the release of $Ar$, but it has been supplemented by a ground connected via make contacts $Ka_5$ and $Kc_5$ so that the operation continues independently of $A_2$.

$Kcr$ locks itself via its contact $Kc_1$ and make contact $Kb_5$ to ground. Further at $Kc_9$ it opens the circuit for $Sr$, which releases.

FOURTH PERIOD

The release of $Sr$ causes the operation of $Kdr$ as follows: Ground, break $S_1$, make $C_6$, make $Kc_8$, winding of $Kdr$ to battery.

$Kdr$ locks via its contact $Kd_1$ and make contact $Kc_2$ and its operation marks the beginning of the fourth period. It further overbridges at $Kd_2$ the break produced by $Kc_9$ in the operating circuit of $Sr$, which re-energises.

FIFTH PERIOD

The operation of $Sr$ causes the release of relay $Kar$. This relay was held until now via break contacts $Kd_6$ and $S_3$ and from the moment $Kdr$ energised, it was dependent on the break contact $S_3$ of $Sr$ alone. It will, therefore, release as soon as $Sr$ operates. The release of $Kar$ marks the beginning of the fifth period. At its make contact $Ka_7$ it opens the circuit for $Sr$, since this is also opened at break contact $Kb_9$. $Sr$ releases.

SIXTH PERIOD

The release of $Sr$ causes the release of relay $Kbr$, which up till now was holding via make contact $Ka_2$ and make contact $S_4$. Since $Kar$ released, it was, therefore, dependent on the make contact of $Sr$ alone and will release as soon as this opens. The release of $Kbr$ marks the beginning of the sixth period and it will further reclose the circuit for $Sr$ at contact $Kb_9$. $Sr$ re-energises.

SEVENTH PERIOD

When $Sr$ re-energises it causes the release of $Kcr$, which was holding up till now via make contact $Kb_5$ and break contact $S_4$. Since $Kbr$ released, it depended for its holding on the break contact of $Sr$ alone and will, therefore, release as soon as $Sr$ operates. The release of $Kcr$ marks the beginning of the seventh period. It further causes the release of relay $Sr$ by opening the ground at contacts $Kc_5$ and $Kc_7$.

EIGHTH PERIOD

When $Sr$ releases, it causes the release of relay $Kdr$, since this up till now was holding via make contacts $Kc_2$ and $S_2$ and therefore, after the release of $Kcr$, $Kdr$ is dependent on the make contact of $Sr$ alone and will consequently release as soon as $Sr$ releases.

When $Kdr$ has released, the cycle of operations is completed and the circuit is ready to commence another cycle upon the re-operation of relay $Ar$ via the junction, provided relay $Csr$ is still operated.

It will now be considered in which way the four VF-impulses are sent out under the control of the counting relays.

A circuit is closed from the primary winding of the transformer $CT$ to one of the sources of 600 C. P. S. or 900 C. P. S. alternating current in the first, third, fifth and seventh periods of the above described counting relay cycle. These circuits are so closed via contacts of the counting relays that in the first period the circuit is controlled by change-over contact $Za_4$, in the third period by change-over contact $Zb_4$, in the fifth period by change-over contact $Zc_3$, and in the seventh period by change-over contact $Zd_1$.

Whenever any of these four change-over contacts is in the normal condition, it will complete the circuit to the 600 C. P. S. source in the corresponding period; whenever it is in the operated condition it will close the circuit to the 900 C. P. S. source in the corresponding period. It will, therefore, be evident that if the relays $Zar$—$Zdr$ have been energised according to a certain four-unit permutation code, signifying a numerical value, the four impulses sent out consecutively will be in a similar permutation code, in which each impulse is used to signal the condition of one of the four relays; a 600 C. P. S. impulse will signify the non-operated condition of the relay and a 900 C. P. S. impulse will signify the operated condition of the relay. It is, therefore possible by signalling by means of four impulses the condition of these four relays to a distant register and cause thereby the operation, at that register, of four registering relays in the same code as those at the originating register.

The paths of the four impulses impressed on the transformer $CT$ may be traced as follows:

*First period.*—From primary winding of transformer via make $C_2$, break $Kb_3$, make $Ka_3$ via change-over $Za_4$ to one of the VF-sources.

*Third period.*—From transformer via make $C_2$, make $Kb_3$, make $Ka_3$, make $Kc_3$, break $Kd_5$ and via change-over $Zb_4$ to one of the VF-sources.

*Fifth period.*—From primary winding of transformer via contact $C_2$, make $Kb_3$, break $Ka_3$ and via change-over $Zc_3$ to one of the VF-sources.

*Seventh period.*—From transformer via make $C_2$, break $Kb_3$, break $Ka_3$, break $Kc_3$, make $Kd_3$ and via change-over $Zd_1$ to one of the VF-sources.

In the second, fourth, sixth and eighth periods, the circuit for the transformer is open.

Four impulses characterizing the operated or unoperated conditions of the four relays $Zar$—$Zdr$, respectively, have thus been transmitted to the terminating register, where they have been received and recorded in a manner to be described in detail hereafter.

It will be clear to one skilled in the art that, if now the storage relays become operated in another combination to record another dialled digit and relay $Csr$ again operates, the cycle of the counting relays will be repeated and another digital value will be transferred to the terminating register.

It will also be appreciated that the transmission of voice frequency impulses will cease if at any time the terminating register signals the reception of an insufficient number of impulses to complete a digital value by failing to reclose the direct current circuit over the $a$ wire of the junction.

Signalling of condition of called subscriber's line

After the completion of the transfer of the called subscriber's line number to the terminating register, the equipment of Fig. 2 remains quiescent until it receives a signal that the latter register has selected and tested said line and is ready to signal its condition to the originating register. At this moment, a new sequence of operations is now commenced which is introduced by the closure at the distant register of the circuit via the $b$ wire of the junction, owing to which relay $Br$ at the originating register, Fig. 2, will operate. The operation of $Br$ short circuits relay $Cr$ by connecting ground via make $B_4$ to the point of juncture between the winding of $Cr$ and the 600 w. resistance with which it is connected in series to the battery. Relay $Cr$ releases and thereby prepares the register circuit for the receipt of the called subscriber's line condition. The signalling of this condition proceeds by a sequence of compulsory operations in which VF-signals sent from the originating register alternate with D. C.-signals sent from the distant register in such a manner that the signal from either register results from the receipt of the preceding signal from the co-operating circuit. This sequence will continue until the distant register opens the circuit via the $b$ wire of the junction. This may happen at different moments, viz. after any particular one of several signals have been exchanged between the two registers. In the present circuit it has been assumed that 5, any one of five, different conditions of the wanted subscriber's line must be signalled and the arrangement has been made in such a manner that the condition which is occurring most frequently will be signalled by the opening of the $b$ wire circuit after one exchange of signals between the two registers. The condition occurring next in frequency will be signalled after two exchanges of signals between the two registers, etc.

The five conditions to be signalled are in their order of expected frequency of occurrence:

a. Subscriber's line free.
b. Subscriber's line busy.
c. Non-used number (so called dead line).
d. Changed number.
e. Subscriber's line.

It may be seen that for condition $e$ an exchange of signals will take place 5 times between the two registers. For this case, the train of operations may be considered as divided into five periods and from what has been said above it will be clear that the condition of the called subscriber's line may be signalled by the opening of the $b$ wire at the distant register in any of these periods, viz. for condition $a$ in the first period, for condition $b$ in the second period, etc.

Upon the release of relay $Cr$, as described above, the originating register connects the 900 C. P. S. source to the primary winding of transformer CT in the following circuit: From primary winding of CT via make $B_2$, breaks $Kb_3$, $Ka_3$, $Kc_3$, $Kd_3$ and $C_{10}$ to the 900 C. P. S. source.

The sending of this 900 C. P. S. tone marks the first period and if the called subscriber's line is in condition $a$, this will be signalled by the opening of the circuit via the $b$ wire of the junction at the distant register, upon the receipt of this 900 C. P. S. tone at the distant register. Assuming the subscriber's line to be in condition $a$, the opening of the $b$ wire causes the release of $Br$ and this will energise the relay $Sfr'$ in the following circuit: Ground, break contacts $B_6$, $C_4$, $Kd_4$, $Kc_4$, $Kb_4$, $Ka_4$, winding of $Sfr'$ to battery.

The operation of relay $Sfr'$ signifies that the called subscriber has been found free and this relay now causes the through-switching of the calling subscriber to the distant exchange and the disconnection of the originating register in a manner which will not be further described here.

Assuming, however, that the called subscriber's line is not free, the receipt of the 900 C. P. S. tone at the distant register will be acknowledged from the latter by the closure of the circuit via the $a$ wire of the junction, owing to which relay $Ar$ energises. The operation of $Ar$ causes $Sr$ to energise via ground at $A_2$ and break $C_9$, and this relay in its turn causes $Kar$ to operate in the following circuit: Ground, make $S_1$, break $Kd_8$, break $Kb_8$, winding of $Kar$ to battery.

$Kar$ locks itself via its make contact $Ka_1$ and break contact $Kd_6$ to ground.

The operation of $Kar$ disconnects the 900 C. P. S. tone from the primary winding of transformer CT and connects the 600 C. P. S. tone instead in the following circuit: Primary winding of transformer CT, make $B_2$, break $Kb_3$, make $Ka_3$, break $Za_4$ to the 600 C. P. S. source.

The connection of the 600 C. P. S. tone to the junction marks the second period. If the wanted subscriber's line is in condition $b$, receipt of this tone is acknowledged from the distant register by the opening of the circuit via the $b$ wire of the junction, causing $Br$ to release and this now causes the operation of relay $Sbr'$ in the following circuit: Ground, break contacts $B_6$, $C_4$, $Kd_4$, $Kc_4$ and $Kb_4$, make contact $Ka_4$, winding of $Sbr'$ to battery.

The operation of $Sbr'$ signifies that the wanted subscriber's line is busy and will cause the connection of the busy tone to the calling subscriber and the disconnection of the register in any convenient manner which will not be further described here.

Assuming, however, that the wanted subscriber's line is neither in condition $a$ nor $b$ then the receipt of the 600 C. P. S. tone at the distant register will be acknowledged from the latter by the opening thereat of the circuit via the $a$ wire of the junction, resulting in the release of relay $Ar$. $Ar$ causes the release of $Sr$ by opening the ground at $A_2$ and $Sr$, in its turn by releasing, causes the operation of $Kbr$ in the following circuit: Ground, break $S_1$, make $B_1$, break $Kc_3$, make $Ka_6$, winding of $Kbr$ to battery.

$Kbr$ locks itself via its contact $Kb_1$ and make $Ka_2$ to ground.

The operation of $Kbr$ causes the disconnection of the 600 C. P. S. tone from the junction and the connection of the 900 C. P. S. tone instead by the changeover of contact $Kb_3$ in the following circuit: Primary winding of transformer CT, make $B_2$, make $Kb_3$, make $Ka_8$, break contacts $Kc_3$, $Kd_3$ and $C_{10}$ to the 900 C. P. S. source.

The connection of the 900 C. P. S. tone to the junction marks the third period. If the wanted subscriber's line is in condition $c$, the receipt of this tone will be acknowledged from the distant register by the opening of the circuit via the $b$ wire, owing to which $Br$ releases. In this case the release of $Br$ causes the operation of $Dlr'$ in the following circuit: Ground, break contacts $B_6$, $C_4$, $Kd_4$, $Kc_4$, make contact $Kb_4$, winding of $Dlr'$ to battery.

The operation of $Dlr'$ signifies that a non-used number (dead line) has been called and it will cause the register to proceed with the further operations as are required for this class of call in any convenient manner.

Assuming, however, that the wanted subscriber's line is neither in condition $a$, $b$ nor $c$, the connection of the 900 C. P. S. tone to the junction in the third period will be acknowledged from the distant register by the re-closure of the circuit via the $a$ wire of the junction, owing to which A$r$ operates. This causes the re-energisation of S$r$ in the same manner as in the first period and this in its turn causes the operation of K$cr$ in the following circuit: Ground, make S$_1$, break K$d_3$, make K$b_3$, break C$s_2$ (it will be understood that relay C$sr$ is no longer operated, since the transfer of the called line number has been completed, so that contact C$s_2$ is now closed) winding of K$cr$ to battery.

The operation of K$cr$ disconnects the 900 C. P. S. tone and connects the 600 C. P. S. tone instead in the following circuit: Primary winding of transformer CT, make contacts B$_2$, K$b_3$, K$a_3$ and K$c_3$, break contacts K$d_5$ and Z$b_4$ to the 600 C. P. S. source.

The connection of the 600 C. P. S. tone to the junction marks the fourth period and if the wanted subscriber's line was in condition $d$ its receipt will be acknowledged from the distant register by the opening of the circuit via the $b$ wire of the junction, owing to which relay B$r$ will release. Relay C$nr'$ is then operated in the following circuit: Ground, break contacts B$_6$, C$_4$ and K$d_4$, make contact K$c_4$, winding of C$nr'$ to battery.

The operation of C$nr'$ signifies that the wanted subscriber's line was a changed number and it will cause the register to proceed with the operations as required for this class of call, again in any convenient manner.

Assuming however, that the condition of the wanted subscriber's line does not fall in one of the first four categories, then the connection of the 600 C. P. S. tone in the fourth period will be acknowledged from the distant register by the opening of the circuit via the $a$ wire, owing to which A$r$ releases and in consequence also S$r$ de-energises. This in its turn causes the operation of K$dr$ in the following circuit: Ground, break S$_1$, make B$_1$, make K$c_3$, winding of K$dr$ to battery.

The operation of K$dr$ disconnects the 600 C. P. S. tone from the junction and connects the 900 C. P. S. tone instead in the following circuit: Primary winding of transformer CT, make contacts B$_2$, K$b_3$, K$a_3$, K$c_3$ and K$d_5$, break contact C$_{10}$ to the 900 C. P. S. source.

The connection of the 900 C. P. S. tone to the junction marks the fifth period and if the subscriber's line is in condition $e$, receipt of the tone will be acknowledged from the distant register by the opening of the circuit via the $b$ wire of the junction. This causes B$r$ to release and the operation of A$sr'$ in the following circuit: Ground, break contacts B$_6$ and C$_4$, make contact K$d_4$, winding of A$sr'$ to battery.

The operation of A$sr'$ signifies that the called subscriber's line is in the "absent subscriber" condition and it causes the originating register to proceed with such operations as are required for this class of call.

In the circuit as given by way of example on the drawing, there are only five conditions in which the called subscriber's line may be found. It will be evident, however that it is possible to provide for signalling any one of more than five conditions by continuing the operation for further conditions in a similar manner as described hereabove. In this case the further operations and de-energisations of relays A$r$ and S$r$ will consecutively cause the release of the counting relays K$ar$, K$br$, K$cr$ and K$dr$ in the order mentioned and the release of each of these relays provides a new condition which may be further used for the operation of "class of call" relays similar to the five relays already referred to.

The manner in which the four counting relays K$ar$—K$dr$ will be made to release by continued oscillation of relay S$r$ is the same as for the case of code signalling as described above and will not be further described here.

The operation of the equipment of Fig. 2 in fulfilling its two designed purposes, namely, the transmission, during the establishment of a telephone connection, of voice frequency code signals representing the values of one or more digits of a called line number to a distance register at a terminating exchange, and after an interval of time the exchange of signals with said register whereby an indication of the condition of the called line is received at the originating exchange, has now been described.

Figure 3:
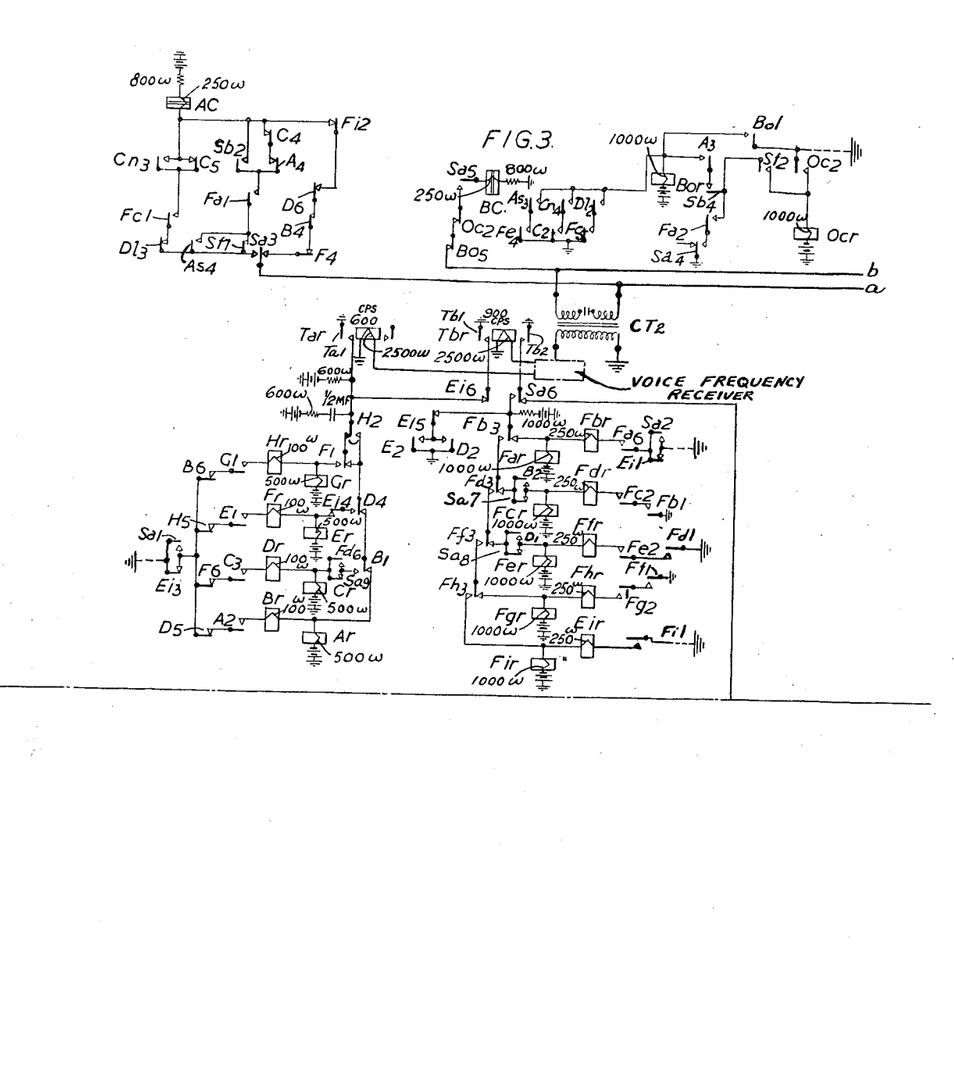
Figs. 3 and 3A, when juxtaposed one above the other, show the cooperating parts of a register at a terminating exchange.
Figure 3A:
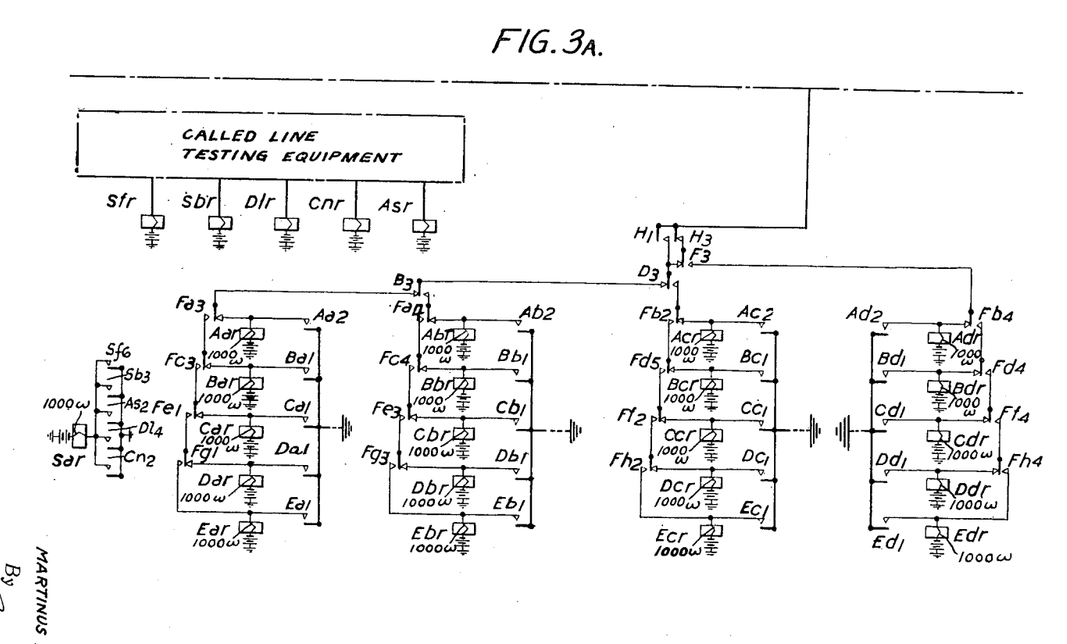

The operations which occur in the equipment of Figs. 3 and 3A (which, as stated, forms a part of said distant register), during the abovementioned operations will now be considered.

With reference to Figs. 3 and 3A, the equipment provided in a terminating register for signalling to and from distance exchanges comprises a voice frequency signal receiver represented only by the input transformer CT2 and the two resonant relays T$ar$ and T$br$ which operate upon the receipt of a 600 C. P. S. and a 900 C. P. S. signal respectively. Further, the equipment includes a number of common counting relays, viz. four pairs of relays A$r$—H$r$, four pairs of relays F$ar$—F$hr$ and an additional pair of relays F$ir$ and E$ir$. Further, in Fig. 3A there are four relays for every digit to be recorded, viz. A$ar$—A$dr$ for the first digit, B$ar$—B$dr$ for the second digit, etc. The drawing shows the relays required for registering five digits. Figure 3A shows also five relays S$fr$, S$br$, D$lr$, C$nr$ and A$sr$, for the five conditions in which the called subscriber's line may be found, viz:

S$fr$ when the line is found free,
S$br$ when the line is found busy
D$lr$ when a non-used number (dead line) is called,
C$nr$ when a changed number is called,
A$sr$ when the line is in the absent subscriber condition.

Further, in Fig. 3, two retardation coils, AC and BC, and two helping relays, O$cr$ and B$or$, are shown.

The V. F. receiving equipment and the counting relays are used both for the receipt of code signals from the originating register and for transmission to the originating register of the condition of the called subscriber's line. It will, therefore, be necessary to give descriptions of the operation of these relays in both cases, in order to explain their different functions; these now follow.

It will be understood, from the foregoing description of the operation of the equipment of Fig. 2, that an interval of time occurs between the transfer of the digits of a wanted line number from an originating exchange to a terminating exchange and the exchange of signals between these exchanges for indicating the condition of the called line. During this interval, whilst the terminating register is engaged in controlling the selection of the called line and in testing it, the equipment of Figs. 3 and 3A remains quiescent.

It will also be understood that the appropriate one of the five line condition relays $Sfr$, $Sbr$, $Dlr$, $Cnr$ and $Asr$ can be operated in any convenient manner by the line testing equipment of the register, as a necessary preliminary to the second phase of the operation of the equipment of Fig. 3. A preferred method of controlling these relays is disclosed in my U. S. application, Serial No. 726,359, filed on February 4, 1947, now Patent No. 2,593,418, issued on April 22, 1952, in which similarly designated line condition relays appear in Fig. 2A.

Receipt of code signals from the originating register

When a connection has been established between a register at an originating exchange and a register at a terminating exchange, as diagrammatically illustrated in Figs. 1 and 1A, the fact that the equipment of Figs. 3 and 3A at the terminating register is ready to receive the codes representing the digits of the wanted subscriber's number from the originating register is signalled to the latter by the battery normally connected to the $a$ wire of the junction in the following circuit: Battery, 800 w. resistance, retardation coil AC, break contacts $Fi_2$, $Fa_5$, $D_6$, $B_4$, $F_4$, $Sa_3$ to the $a$ wire of the junction Fig. 3.

The originating register upon the receipt of this D. C. signal, proceeds to transmit one or more trains of voice frequency impulses, as already described, each train comprising four impulses representing a digital value and the successive impulses having either 900 C. P. S. or 600 C. P. S., in accordance with the permutation code shown in the following table, in which an impulse of 900 C. P. S. is represented by the sign "+," an impulse of 600 C. P. S. by the sign "−":

| Numerical value | 1st impulse | 2nd impulse | 3rd impulse | 4th impulse |
|---|---|---|---|---|
| 1 | + | − | − | − |
| 2 | − | + | − | − |
| 3 | + | + | − | − |
| 4 | − | − | + | − |
| 5 | + | − | + | − |
| 6 | − | + | + | − |
| 7 | + | + | + | − |
| 8 | − | − | − | + |
| 9 | + | − | − | + |
| 10 | − | − | + | + |

In a preferred embodiment of the invention, each impulse has a duration of approximately 35 ms. and there is an interval of 35 ms. between successive impulses.

With reference again to Figs. 3 and 3A, the relays $Ar$ to $Hr$ serve to count the number of impulses received from the originating register and for this purpose make contacts $Ta_1$ and $Tb_1$ on relays $Tar$ and $Tbr$ are connected in parallel to cause the operation of these relays, when either $Tar$ or $Tbr$ energises. This happens as follows: For the 1st impulse relay $Ar$ energises from ground at either $Ta_1$ or $Tb_1$ via break contacts $H_2$, $F_1$, $D_4$, $B_1$, winding of $Ar$ to battery.

In the first interval $Br$ operates via A2 make contact in the locking circuit of $Ar$ to ground in the following circuit: Ground, break contacts $Ei_3$, $D_5$, make $A_2$, windings of $Br$ and $Ar$ to battery.

The second impulse operates $Cr$ in the following circuit: From ground at either $Ta_1$ or $Tb_1$ via break contacts $H_2$, $F_1$, $D_4$, make contact $B_1$ break contact, $Sa_9$, winding $Cr$ to battery.

In the interval following this impulse $Dr$ operates in series with $Cr$ in its locking circuit as follows: Ground, break contacts $Ei_3$, $F_6$, make $C_3$, windings of $Dr$ and $Cr$ to battery.

When $Dr$ operates it opens at contact $D_5$ the holding circuit of relays $Ar$ and $Br$ which release.

The third impulse operates $Er$ as follows: From ground at $Ta_1$ or $Tb_1$, break contacts $H_2$, $F_1$, make $D_4$, break $Ei_4$, winding $Er$ to battery.

In the interval following this impulse, $Fr$ energises in the locking circuit of $Er$ in series therewith and at its contact $F_6$ opens the holding circuit for $Cr$ and $Dr$ which release.

The fourth impulse causes the operation of $Gr$ via break $H_2$ and make $F_1$ and in the interval following this, $Hr$ energises in series with $Gr$ and at its break contact $H_5$ opens the holding circuit for $Er$ and $Fr$, which release.

At the end of a train of four impulses, relays $Gr$ and $Hr$ are therefore left energised.

When the first impulse for the next train of four impulses arrives, the circuit for $Ar$ is completed via make contact $H_2$ and when this impulse is over the operation of $Br$ opens the holding circuit at contact $B_6$ for $Gr$ and $Hr$ which then release, so that the circuit for the second impulse again leads via break contact $H_2$.

When an impulse with a frequency of 900 C. P. S. is received, a circuit will be closed from contact $Tb_2$ to operate one of the recording relays. For each digit one set of four recording relays is provided, and each of these relays corresponds to one of the four impulses for a digit, in such a manner that the first relay will operate if the first impulse is 900 C. P. S., the second relay operates if the second impulse is 900 C. P. S., etc. In this manner the four relays for each digit will be operated or left unoperated in a permutation code identical to that given in the table hereabove, which may also be considered to refer to the operated condition of these relays. For this purpose the four columns representing the four impulses should be taken to signify the four relays provided for each digit, the sign "+" signifies that the relay is operated and the sign "−" signifies that the relay is released.

By way of example, the circuit for the operation of the first set of relays will be described for a hypothetical case, assuming that all four impulses had a frequency of 900 C. P. S., so that all four relays would energise:

The circuit for the first relay, $Aar$, is closed during the receipt of the first impulse (i. e. at a time that relays $Gr$ and $Hr$ are not operated) in the following circuit: From ground at $Tb_2$ via break contacts $Sa_6$, $H_3$, $F_3$, $D_3$, $B_3$ and $Fa_3$, winding of $Aar$ to battery.

In the case of all further digits the circuit for the first relay of each set will not be completed over break contact $H_3$ but over make contact $H_1$, since then relays $Gr$ and $Hr$ are in operated condition.

$Aar$ locks itself via its contacts $Aa_2$ to ground.

The circuit for relay $Abr$ is closed during the second impulse (i. e. at a time that relays $Ar$ and $Br$ are energised) in the following circuit: From ground at $Tb_2$ via break contacts $Sa_6$, $H_3$, $F_3$ and $D_3$, make $B_3$, break $Fa_4$, winding of $Abr$ to battery.

$Abr$ locks via its contact $Ab_2$ to ground.

Relay $Acr$ will operate during the receipt of the third impulse (i. e. at a time that relays $Cr$ and $Dr$ are energised) in the following circuit: From ground at $Tb_2$ via break contacts $Sa_6$, $H_3$, $F_3$, make $D_3$, break $Fb_2$, winding of $Acr$ to battery.

Acr locks via its contact Ac₂ to ground.

Relay Adr will be operated during the fourth impulse (i. e. when relays Er and Fr are energised) in the following circuit: From ground at Tb₂, break contacts Sa₆ and H₃, make contact F₃, break contact Fb₄, winding Adr to battery.

Adr locks itself via its contact Ad₂ to ground.

The counting relays Far to Fhr and the last pair Fir and Eir serve to count the number of digits received; thus the first pair Far and Fbr will operate to record the receipt of the first digit, the second pair Fcr and Fdr will operate to record the receipt of the second digit, etc. Finally the last pair Fir and Eir will be energized when the fifth and last digit has been received. The relay Eir is, therefore, the "end-of-impulsing" relay.

The first relay of each pair operates from a make contact of relay Dr when this energises, for example in the case of the first digit in the following circuit: Ground at D₂, break contacts Ei₅ and Fb₃, winding of Far to battery.

The ground at D₂ is continued by make contact E₂ also after the pair of relays Cr and Dr has released and until the pair of relays Er and Fr release, which is at the moment Hr operates, i. e. after the last impulse of the digit has been received. Therefore, immediately upon having received the last impulse of the digit and contacts D₂ and E₂ being both open, Fbr operates in series with Far and the two relays lock under the control of Fa₆ and a break contact Eil to ground. Change-over contact Fb₃ then switches over the operating circuit for these relays to the next pair, Fcr and Fdr.

The operation of a pair of digit-counting relays, such as Far and Fbr, results in the switching-over of the operating circuits for the registering relays to the next set. This is effected after the first digit by the four contacts Fa₃, Fa₄, Fb₂ and Fb₄, and the remaining sets of registering relays are successively brought into circuit by similar contacts on the other digit-counting relays in a similar manner after each digit received.

During the silent interval after the first VF-impulse of each digit, the battery to the a wire of the junction is disconnected at break contact E₄. This opening is continued after the release of Br by break contact D₆, and subsequently, after the release of Dr, by break contact F₄. As relay Fr releases only after the energisation of Hr, i. e. after four impulses have been received, the circuit for the a wire will be reclosed, and consequently the originating register will be permitted to commence with sending the four impulses of the next digit, only after it has been ascertained that four impulses have been effectively received.

When the last digit has been received and relay Eir has energised and locked to ground at Fil, the make contact Tb₁ is disconnected from make contact Ta₁ at break contact Ei₆. The counting relays Ar to Hr are, therefore from this moment, under the exclusive control of Tar. At the same time at break contact Ei₃, the holding circuit for all these counting relays is opened so that any of these relays which are still operated, will release. Break contact Fi₂ prevents the reclosure of the circuit for the a wire, even if the last digit has been completely received. Also, the holding circuit for the pair of relays Far and Fbr is opened at break contact Eil. Far and Fbr release and in turn, by contact Fb₁, causes the release of Fcr and Fdr. Fdr in its turn, by opening contact Fd₁, causes the release of relays Fer and Ffr. Ffr, by opening its contact Ff₁, causes the release of Fgr and Fhr. The pair of relays Fir and Eir, together with such of the digit recording relays as have been operated, will continue to hold and the equipment is now ready to start the second phase of its operation.

*Signalling of condition of called subscriber's line to originating register*

When the subscriber's line has been tested and its condition has been determined, one of the five relays Sfr, Sbr, Dlr, Cnr or Asr will operate in accordance therewith. Make contacts of each of these relays (Sf₆, Sb₆, D₁₄, Cn₂, or As₂) are connected in parallel to cause the operation of Sar when any one of these relays operates. This relay prepares the terminating register circuit for signalling the condition of the wanted subscriber's line to the originating register. The functions of this relay are as follows:

In the first place, at its contact Sa₁ it overbridges contact Ei₃, so that the holding ground for the counting relays Ar to Hr is restored. In the second place, at contact Sa₆ it charges over the connection from contact Tb₂, so that relay Tbr now controls the counting relays Far to Fhr. At the same time it should be noted that the original operating circuit for these counting relays via make contacts D₂ and E₂ is now opened at the break contact Ei₅. Thirdly, Sar at its contacts Sa₇, Sa₈ and Sa₉ opens one path for the operation of the counting relays Fcr, Fer and Cr respectively. In the fourth place, at the contact Sa₂ it restores the holding ground for the first pair of counting relays Far and Fbr. Fifthly, at change-over contact Sa₃ it brings the connection of battery to the a wire under the control of a number of relays which in due time will complete this battery connection, but which, at this instant, hold it disconnected. Finally, at contact Sa₅ it closes ground to the b wire of the junction in the following circuit: Ground, 800 w. resistance, retardation coil BC, make contact Sa₅, break contacts Oc₂ and Bo₅ to the b wire of the junction.

The connection of this ground signals to the originating register, that the terminating register is ready to indicate the condition of the wanted subscriber's line and in response thereto the originating register connects a tone with a frequency of 900 C. P. S. to the junction, as already described. When this tone is received, Tbr operates and causes the operation of counting relay Far at its contact Tb₂. It is to be noted here that the contact X shown in Fig. 1A is a diagrammatic representation of the several contacts by which the retardation coil AC, Fig. 3, may be connected to the a wire of the junction; similarly, the contact Y represents diagrammatically the three contacts Sa₅, Oc₂, Bo₅, connected between coil BC and the b wire.

Five different cases may now occur:

If the subscriber's line is free, the receipt of the 900 C. P. S. tone marks the moment this condition is to be signalled to the originating register by opening the ground to the b wire of the junction. If on the other hand, the wanted subscriber's line is in one of the other four possible conditions, the operation is continued in a different way as will be described herebelow and the circuit for the b wire is kept closed.

(a) CASE OF WANTED SUBSCRIBER'S LINE FREE

In this case the relay $Sfr$ is operated and at the moment $Far$ operates, a circuit will be closed for the operation of relay $Ocr$ as follows: Ground at make contact $Sa_4$, make contacts $Fa_2$ and $Sf_2$, winding of $Ocr$ to battery.

$Ocr$ at its contact $Oc_2$ opens the ground to the $b$ wire, which, when it occurs during the time the 900 C. P. S. current is sent for the first time, is the signal to the originating register indicating that the subscriber's line is free. The operation of $Ocr$ further causes the terminating register to proceed with the necessary operations for connecting ringing current to the called party and for disconnecting the terminating register from the connection in a manner which will not further be described here.

(b) CASE OF CALLED SUBSCRIBER'S LINE FOUND BUSY

In case the called subscriber's line is found busy, relay $Sfr$ is not operated, but $Sbr$ instead. The operation of $Far$ resulting from the receipt of 900 C. P. S. current in this case causes the connection of battery to the $a$ wire of the junction in the following circuit: Battery, 800 w. resistance, winding of retardation coil AC, make contact $Sb_2$, make contact $Fa_1$, break contact $Sf_7$, make contact $Sa_3$ to the $a$ wire of the junction.

The closure of the circuit via the $a$ wire causes the originating register to disconnect the 900 C. P. S. source and to connect the 600 C. P. S. source instead, as already described. As a consequence, relay $Tbr$ releases and $Tar$ operates. $Tbr$ releasing causes $Fbr$ to operate in series with $Far$. $Tar$ operating causes the operation of $Ar$.

In the case now being considered this is the moment at which the terminating register may signal the fact that the subscriber's line has been found busy. It does so again by opening the ground connection to the $b$ wire, which in this case takes place through the agency of relay $Bor$ at its contact $Bo_5$, $Bor$ operating in the following circuit: Ground at make contact $Sa_4$, make contacts $Fa_2$, $Sb_4$ and $A_3$, winding of $Bor$ to battery.

The operation of $Bor$ also brings the terminating register in a condition in which it awaits the release of the distant connection under the control of the originating register.

(c) CASE OF WANTED NUMBER NOT USED ("DEAD LINE")

In case the called subcriber's number was found to be a dead line, relay $Dlr$ is operated instead of $Sbr$ and in this case relay $Bor$ does not operate, but instead thereof the battery to the $a$ wire of the junction is disconnected by the operation of $Ar$ at its contact $A_4$.

The disconnection of battery from the $a$ wire of the junction indicates to the originating register that the subscriber's line was not busy and it causes this register to replace the 600 C. P. S. by 900 C. P. S., as a consequence of which $Tar$ releases and $Tbr$ operates. When $Tar$ releases, $Br$ operates in series with $Ar$ and when $Tbr$ operates, it completes a circuit for $Fcr$ from ground at make contact $Tb_2$ as follows: Ground at $Tb_2$, make contacts $Sa_6$ and $Fb_3$, break contact $Fd_3$, make contact $B_2$, winding of $Fcr$ to battery.

The receipt of 900 C. P. S. for the second time marks the moment at which the terminating register may signal the fact that the wanted number was found to be a dead line, which is again affected by opening the ground connection to the $b$ wire of the junction, again by means of contact $Bo_5$, $Bor$ operating this time via make contacts $Fc_5$ and $Dl_2$.

As for case (b) the operation of $Bor$ causes the terminating register to await the release of the connection under the control of the originating register.

(d) THE CALLED SUBSCRIBER'S LINE IS A CHANGED NUMBER

In case the called subscriber's line is found to be a changed number, relay $Cnr$ is operated and in this case the circuit for $Bor$ is not completed when the 900 C. P. S. current is received the second time; instead, the operation of relay $Fcr$ causes the battery to be re-connected to the $a$ wire of the junction in the following circuit: Battery, 800 w. resistance, winding of retardation coil AC, contact $Cn_3$, make contact $Fc_1$, break contact $Dl_3$, make contact $Sa_3$ to the $a$ wire of the junction.

The re-connection of battery to the $a$ wire of the junction signals to the originating register that the called number was not a dead line and it causes this register to replace the 900 C. P. S. by 600 C. P. S., in consequence of which $Tbr$ releases and $Tar$ operates.

The release of $Tbr$ causes $Fdr$ to energise in series with $Fcr$ and this and the operation of $Tar$ cause the operation of $Cr$ in the following circuit: Ground at $Ta_1$, break contacts $H_2$, $F_1$ and $D_4$, make contacts $B_1$ and $Fd_6$, winding of $Cr$ to battery.

This is the moment that the terminating register may signal the fact that the called number is a changed number, which it does again by opening the ground to the $b$ wire at contact $Bo_5$, relay $Bor$ energising this time via make contacts $C_2$ and $Cn_4$.

As in the preceding case $Bor$ causes the terminating register to await the release of the connection under the control of the originating register.

(e) CASE OF ABSENT SUBSCRIBER

In case the called subscriber's line is in the absent subscriber condition, relay $Asr$ is operated and as a consequence, the second connection of the 600 C. P. S. source does not cause the energisation of $Bor$; it causes instead the disconnection of battery from the $a$ wire of the junction. This is effected by the opening of contact $C_5$. The disconnection of battery from the $a$ wire indicates to the originating register that the called line is not a changed number and it causes this register to replace the 600 C. P. S. source by the 900 C. P. S. sourse. As a consequence of this, relay $Tar$ releases and $Tbr$ operates. $Tar$ causes the energisation of $Dr$ in series with $Cr$ and $Dr$ completes the circuit for $Fer$ as follows: Ground at $Tb_2$, make contacts $Sa_6$, $Fb_3$ and $Fd_3$, break contact $Ef_3$, make contact $D_1$, winding of $Fer$ to battery.

This is the moment at which the terminating registry may signal that the called subscriber's number is in the "absent subscriber" condition, which it does by disconnecting ground from the $b$ wire at break contact $Bo_5$. For $Bor$ operates this time via make contacts $Fe_4$ and $As_3$ and as before it brings the terminating register in the condition in which it awaits the release of the connection from the originating register.

It will be evident that any one of more than five possible conditions of the called subscriber's line may be signalled to the originating register if necessary by continuing the operation in a similar manner to that described hereabove and

I claim:

1. In a telecommunication switching system, a plurality of exchanges including an originating exchange and a terminating exchange, a first register at said originating exchange and a second register at said terminating exchange, connecting means interconnecting said registers, means in said second register for applying a first direct current potential to said connecting means, voice-frequency code signal transmitting means in said first register adapted to transmit a plurality of successive spaced code signals representing a numerical digital value, additional means at said first register for controlling said transmitting means to transmit a predetermined number of said signals, means whereby said additional means is made operable in response to said first potential, additional means at said second register for altering said potential, means whereby said last-mentioned means is made operable in response to the receipt of said predetermined number of signals, further means at said first register for controlling said transmitting means to transmit the balance of said signals, means whereby said further means is made operable in response to said altered potential, further means at said second register for re-applying said first potential to said connecting means, and means whereby said last-mentioned means is made operable in response to the receipt of the balance of said signals.

2. A telecommunication switching system as claimed in claim 1, wherein said connecting means comprises a two-conductor junction.

3. A telecommunication switching system as claimed in claim 2, wherein said means for applying a first direct current potential comprises relay means and a source of potential, said relay means adapted to cause the connection of said source to one of the conductors of said junction.

4. In a telecommunication switching system, a plurality of exchanges including an originating exchange and a terminating exchange, a first register at said originating exchange and a second register at said terminating exchange, connecting means interconnecting said registers, means in said second register for applying a first direct current potential to said connecting means, voice-frequency code signal transmititng means in said first register adapted to transmit a plurality of successive spaced code signals representing a numerical digital value, additional means at said first register for controlling said transmitting means to transmit the first of said signals, means whereby said additional means is made operable in response to said first potential, additional means at said second register for altering said potential, means whereby said last-mentioned means is made operable in response to the receipt of said first signal, further means at said first register for controlling said transmitting means to transmit the balance of said signals, means whereby said further means is made operable in response to said altered potential, further means at said second register for re-applying said first potential to said connecting means, and means whereby said last-mentioned means is made operable in response to the receipt of the balance of said signals.

MARTINUS DEN HERTOG.

References Cited in the file of this patent

UNITED STATES PATENTS

| Number | Name | Date |
|---|---|---|
| 1,859,476 | Skillman | May 24, 1932 |
| 1,881,273 | Haigh | Oct. 4, 1932 |
| 1,914,358 | Brooks | June 20, 1933 |
| 2,211,159 | Pfannschmidt | Aug. 13, 1940 |
| 2,272,464 | Hensler | Feb. 10, 1942 |
| 2,332,912 | Hecht | Oct. 26, 1943 |
| 2,356,330 | Lundstrom | Aug. 22, 1944 |